United States Patent [19]

Funk et al.

[11] Patent Number: 4,884,829
[45] Date of Patent: Dec. 5, 1989

[54] PLUG-IN CONNECTION FOR CONNECTING TUBE AND HOST LINES IN PARTICULAR FOR USE IN TUBE-LINE SYSTEMS OF MOTOR VEHICLES

[75] Inventors: Hans G. Funk; Frank Neumann; Dankmar Schäfer, all of Hungen, Fed. Rep. of Germany

[73] Assignee: Johannes Schaefer vorm. Stettiner Schraubenwerke GmbH & Co. KG, Hungen, Fed. Rep. of Germany

[21] Appl. No.: 95,958

[22] Filed: Sep. 10, 1987

[30] Foreign Application Priority Data

Sep. 16, 1986 [DE] Fed. Rep. of Germany ....... 3631460

[51] Int. Cl.$^4$ ........................................... F16L 35/10
[52] U.S. Cl. ...................................... 285/24; 285/39; 285/81; 285/305; 285/321; 285/351
[58] Field of Search ............... 285/305, 81, 332.3, 285/321, 24, 39, 351

[56] References Cited

U.S. PATENT DOCUMENTS

| | | | |
|---|---|---|---|
| 472,342 | 4/1892 | Draudt | 285/321 X |
| 2,438,107 | 3/1948 | Bubbitt | 285/321 |
| 3,104,905 | 9/1963 | Erdmann et al. | 285/321 X |
| 3,314,696 | 4/1967 | Ferguson et al. | 285/305 X |
| 3,389,923 | 6/1968 | Love et al. | 285/321 |
| 3,521,911 | 7/1970 | Hanes et al. | 285/321 X |
| 4,278,276 | 7/1981 | Ekman | 285/321 X |
| 4,294,473 | 10/1981 | Ekman | 285/332.3 X |
| 4,431,218 | 2/1984 | Paul et al. | 285/305 |
| 4,541,657 | 9/1985 | Smyth | 285/305 |
| 4,640,534 | 2/1987 | Hoskins et al. | 285/305 X |
| 4,707,000 | 11/1987 | Torgardh | 285/305 |

FOREIGN PATENT DOCUMENTS

| | | | |
|---|---|---|---|
| 942790 | 11/1963 | United Kingdom | 285/321 |
| 8002059 | 10/1980 | World Int. Prop. O. | 285/321 |

Primary Examiner—Dave W. Arola
Attorney, Agent, or Firm—Flynn, Thiel, Boutell & Tanis

[57] ABSTRACT

A plug-in connection for the connection of tube and hose lines, in particular for use in tube-line systems of motor vehicles, consists of a male part (S), on which is provided a clip receiving locking groove, a female part (A), into which the male part can be sealingly inserted and on which female-part cavities are provided, with which the locking groove can be axially aligned. The locking of the male part (S) and the female part (A) is obtained by means of a locking clip.

To achieve a long lifetime for the plug-in connection even under changing loads and to achieve a simple handling and inexpensive manufacture, the legs (28, 29) of the locking clip ($St_1$) can be spread apart by an elastic deformation and can be maintained in the spread-apart position disengaged from the male part locking mechanism. Between the female part (A) and the male part there is arranged a spring (F) which guyes these parts in an axial direction with respect to one another. A seal ring ($D_1$) is furthermore arranged in a peripheral groove (20) on the male part (S), which seal ring rests sealingly on a cylindrical inner surface (6) of the female part (A).

19 Claims, 6 Drawing Sheets

PLUG-IN CONNECTION FOR CONNECTING TUBE AND HOST LINES IN PARTICULAR FOR USE IN TUBE-LINE SYSTEMS OF MOTOR VEHICLES

FIELD OF THE INVENTION

The invention relates to a plug-in connection for connecting tube and hose lines, in particular for use in tube-line systems of motor vehicles, comprising a male part, on which is provided a clip receiving locking groove, a female part into which the male part can be sealingly inserted and on which female-part cavities are provided, with which the locking groove can be axially aligned, a locking clip with legs, the legs of the locking clip, in the locking position, being received in both the female-part cavities and also the clip receiving locking groove.

BACKGROUND OF THE INVENTION

Releasable connections, which still today are mostly common in tube-line systems of motor vehicles, are screw-type connections with screw caps. Relatively large torques must be applied during tightening of such connections. Such torques can result in damage, for example tearing loose of a welded-on connection onto which the screw cap is to be screwed. Connections, which are only rarely released, also can freeze up, particularly due to corrosion. The torques then needed for the release are greater yet so that the risk of damage also increases. It is also possible for screw caps to loosen due to vibrations, thereby resulting in leakage. In order to be able to apply tools to the screw cap, sufficient space must exist. The coupling and uncoupling of the screw connections is time-consuming. Incorrect coupling due to a skewed attaching of the screw cap often results in the destruction of the threads.

Plug-in connections, which are also used during the building of motor vehicles, do principally not have the mentioned disadvantages of screw connections. Also known (brochure sheet No. 1002/81 of Johannes Schaefer) is a plug-in connection of the abovementioned type for testing connections. The locking clip is in the known plug-in connection introduced with its legs into crossbores of the female part. This introduction is only possible after the plug-in connection has been created, thus requires a separate operation. In order to hold the clip so that it cannot be lost, same is tied to the female part by means of a plastic thread. Such a plug-in connection cannot be used everywhere, since the transverse movement of the locking clip can often not be carried out or can be carried out only with difficulties.

The basic purpose of the invention is to provide a plug-in connection of the abovementioned type such that the plug-in connection has a long lifetime, the locking clip can remain on the female part even after the connection has been released, and the plug-in connection is inexpensive to manufacture. A further purpose includes a securing of the plug-in connection in a simple manner against rotation and in making possible a pressure reduction through the plug-in connection prior to the release.

Through the possibility of movement of the legs of the locking clip, it is possible to move same into a release position without having to be pulled off from the female part. A difficult aligning of the locking clip with the crossbores on the female part is therefore not necessary. After creating the plug-in connection, a light pressure onto the already so to speak premounted locking clip is sufficient to move same into its locking position. It is also possible for the locking clip to assume its locking position already prior to the insertion of the male part. The legs are then spread apart during the insertion of the male part, which is particularly easy if a conical surface is provided for this purposes. The last-mentioned type of mounting is usually used.

The cavities in the female part can be constructed as two or four lateral slots. Such slots can easily be created through milling.

The legs can be spread apart preferably by pulling on the bar of the locking clip. This facilitates a particularly easy operation, since it is sufficient to grip, for example, with a screwdriver under the bar and to pull the bar slightly to the rear, the screwdriver functioning as a lever. The legs can, however, also be pressed together in the spread-apart position, so that they will then lie completely in the female part. The locking clip has then the shape of a Seeger ring.

The legs cooperating with the female part can be constructed particularly easily as bent end sections. The locking clip is preferably a one-piece structural part of wire, for example a wire with a circular cross section (other cross sections are also possible), whereby the wire ends can easily be flexed.

According to the further development of the invention, stops are provided for limiting the retracting movement of the locking clip. These can for example be constructed as milled recesses. This further simplifies the handling of the plug-in connection, since it is not possible, that the locking clip is, for example by mistake, pulled out too far and then becomes removed from the female part.

The construction of the legs of the locking clip with circular sections has the advantage that a large engaging length with the male-part locking groove exists, so that the specific pressure on the abutment points is maintained low.

The seal ring used for sealing has the advantage that the peripheral groove, when a rigid tube is to be connected, can be formed by the material of the tube. Only a small diameter is needed due to this construction. However, the peripheral groove for the seal can also be formed by tapping, for example in a male part, which is to be connected to a hose.

The spring arranged between the female part and the male part preferably presses both apart in axial direction, so that the plug-in connection is axially guyed. An axial guying of plug-in connections is actually known and has, however, in connection with the present invention the important advantage that the male part sits wobble-free in the female part and thus vibrations and more significant breakdowns are avoided. The spring is preferably constructed at the same time as a seal. The deformation of the seal can occur with the same conical surface, which is also used for spreading apart of the locking clip.

A guiding enlargement is preferably provided, which substantially simplifies the coupling, since a rough aligning of the male part on the female part is sufficient in order to start the plug-in process. The locking clip can particularly easily be pulled back, if a space for the engagement of a tool is provided. To protect against rotation of the male part and the female part, a cap is moved over both, which engages, for example, with a nose, both parts. The female part is constructed in two parts for facilitating a pressure reduction in the lines, whereby both parts are provided with a screw thread, through the threads of which, during a rotation out of the closed position, the pressure reduction occurs.

BRIEF DESCRIPTION OF THE DRAWINGS

Exemplary embodiments of the invention are illustrated in the drawings, in which.

DETAILED DESCRIPTION

Figure 1:
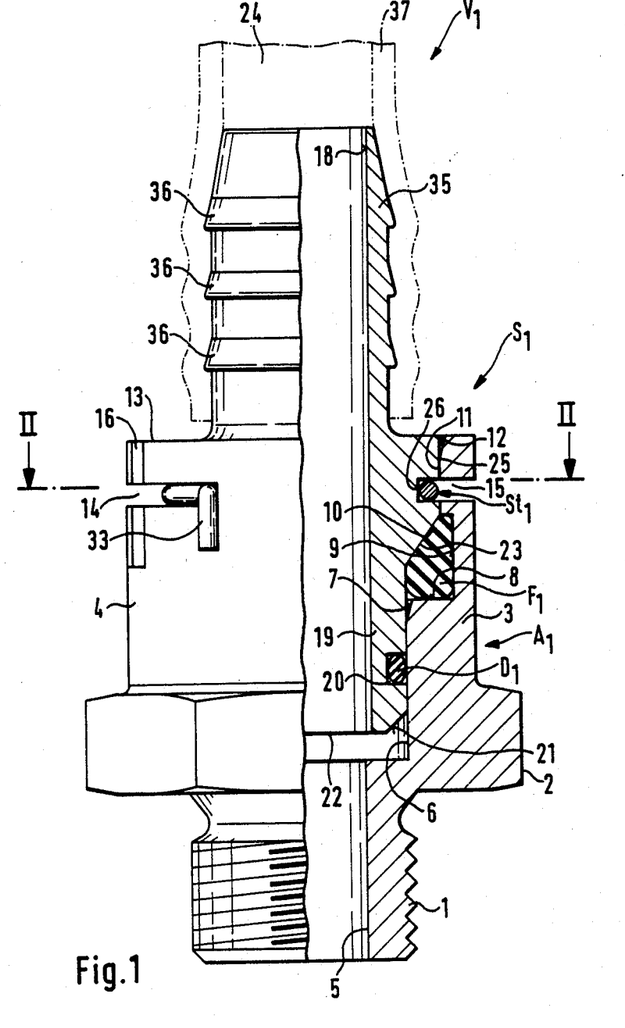
FIG. 1 is an enlarged, partially longitudinal cross-sectional view of a plug-in connection according to a first embodiment of the invention.
Figure 2:
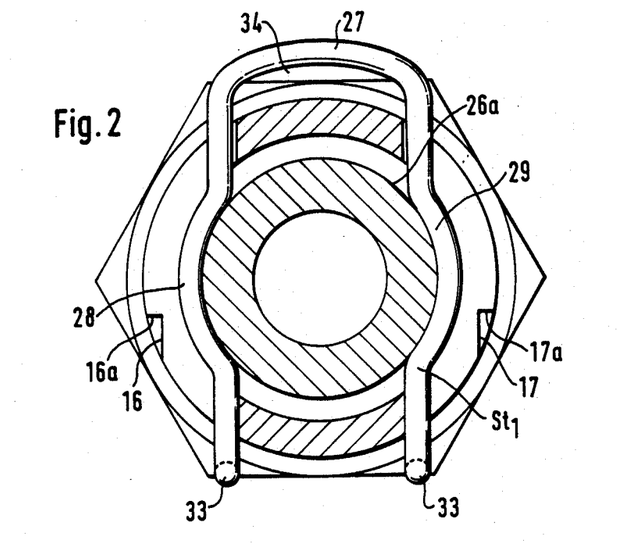
FIG. 2 is a cross-sectional view of the connection taken along the line II—II of FIG. 1 in a locked condition of the connection.
Figure 3:
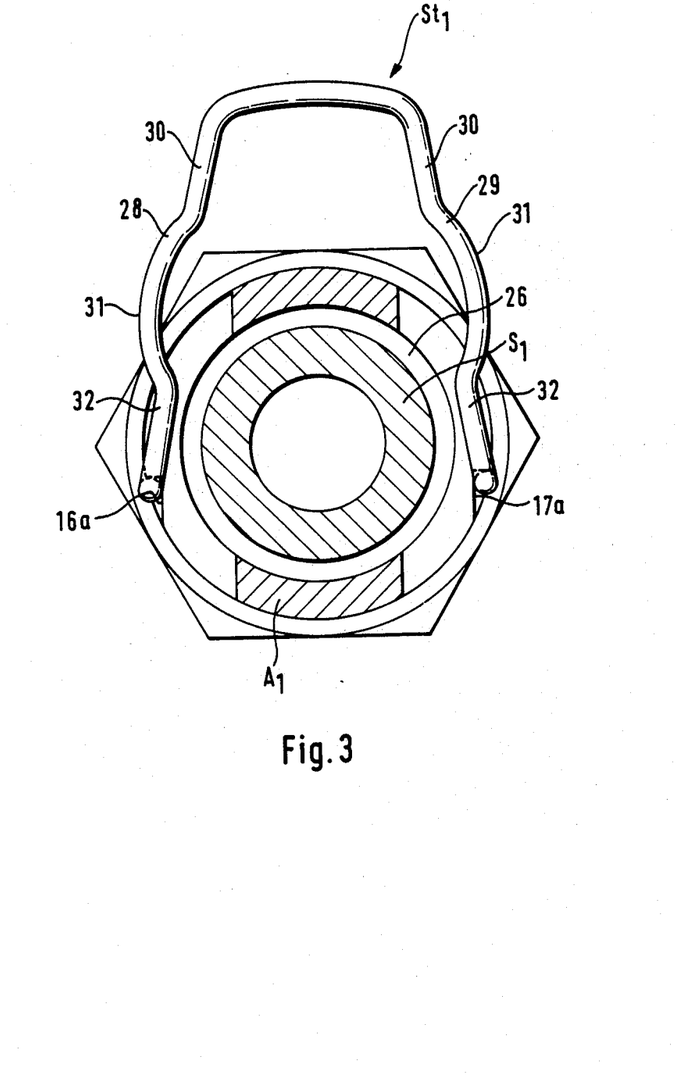
FIG. 3 illustrates a condition corresponding with FIG. 2, whereby, however, a locking clip is in the release position.

The plug-in connection $V_1$ according to FIGS. 1 to 3 consists of a female part $A_1$, a male part $S_1$, a locking clip $St_1$, a seal $D_1$ and an axial spring $F_1$. The female part $A_1$ and the male part $S_1$ consist preferably of metal, for example of brass or aluminum. Other materials, like for example plastic, are also possible. The seal $D_1$ and the axial spring $F_1$ consist of an elastomer material, for example of silicon rubber.

The female part $A_1$ has an external thread 1 at the front end, with which the female part can be screwed for example into a housing. The external thread 1 is followed by a hexagon-shaped shoulder 2, which is followed by a receiving portion 3 having a cylindrical outer surface 4.

A multi-stepped bore extends through the female part. The bore has an end section 5 of a relatively small diameter. A cylindrical section 6 follows to the back of the end section. The section 6 has a substantially larger diameter than the bore section 5. The cylindrical section 6 has a conical enlargement 7 at its upper end. The conical enlargement 7 passes over into a shoulder 8, which is followed by an axially extending cylindrical section 9, which has the largest diameter of the entire opening. The section 9 is limited upwardly by a narrower shoulder 10, which is parallel to the shoulder 8. The shoulder 10 is again followed by an axially extending cylindrical section 11, which at its upper end is enlarged by a conical enlargement 12.

Near the rear end 13 of the female part $A_1$ there are provided diametrically opposed slots 14, 15 for engagement by the locking clip $St_1$. The depth of the slots 14, 15 can be recognized from the cross sections according to FIGS. 2 and 3. Also two recesses 16, 17 are provided on the cylindrical outer surface 4 (see here also FIGS. 2 and 3), which recesses form stop surfaces 16a or 17a for limiting the pull-back movement of the locking clip $St_1$.

The male part $S_1$ has a bore 18 which has a uniform diameter over the entire length of the male part $S_1$, whereby the diameter of the bore 18 corresponds with the diameter of the bore 5.

The male part $S_1$ has a cylindrical section 19 in its front area, on which section 19 is provided an annular groove 20 for receiving the seal $D_1$. A conical surface 21 is provided at the front end of the section 19, which conical surface is tapered toward the front end 22 of the male part $S_1$. A conical section 23 follows to the rear the cylindrical section 19. The conical section 23 enlarges toward the rear end 24 of the male part $S_1$. The conical section 23 is followed toward the rear by a cylindrical section 25, in which a peripheral groove 26 is provided for receiving the locking clip $St_1$ therein.

The male part $S_1$ has approximately in its rear half a mounting area 35 with three ribs, which have a barb-shaped cross section. A hose 37 can be placed onto the mounting area 36. The hose is prevented from coming off by the special shape of the ribs 36.

The locking clip in the characterized exemplary embodiment consists of spring wire having a circular cross section. The locking clip has a bar part 27 and legs 28, 29 connected to the bar part. The legs are a mirror image of one another. Each leg has, following the bar part 27, a straight section 30, followed by a circular section 31, followed by a straight section 32, which is aligned with the section 30, and an end section 33, which projects at a right angle from the section 32.

The seal $D_1$ is a so called O-ring, that is, a closed ring of a rubber-elastic material having a circular cross section.

The spring $F_1$ is at the same time constructed as a seal and consists of an elastomer material. The axial spring $F_1$ has an approximately rectangular cross section in the relaxed state.

The connection $V_1$ operation operates as follows: The locking clip $St_1$ engages with the circular sections 31 of its legs 28, 29 the annular groove 26 in the male part $S_1$ in the locking condition illustrated in FIGS. 1 and 2. FIG. 2 shows that the inside diameter of the section 31 corresponds with the inside diameter of the peripheral groove 26 of the male part $S_1$. The legs 28, 29 simultaneously engage the slots 14, 15. It can easily be recognized that the male part $S_1$ is in this manner axially secured relative to the female part $A_1$.

The axial spring $F_1$ is compressed in the locking condition and urges the male part $S_1$ out of the female part $A_1$. An axial guying is thus created and consequently a totally wobblefree seat. Fluid contained in the bores 18, 15 is sealed off by the seal $D_1$. The seal $D_1$ is protected from the outside against dirt and moisture by the axial spring $F_1$ which acts simultaneously as a seal. The axial spring $F_1$ can also take over the function of an emergency seal, if the seal ring $D_1$ should fail. The axial spring $F_1$ is axially secured by the shoulders 8 and 10 in the female part $A_1$, so that a shifting of the axial spring $F_1$ does not need to be feared neither during the creating of the connection nor in the released condition. If the connection is to be released, a screwdriver or any other suitable tool engages the space 34 between the bar 27 of the locking clip $St_1$ and the female part $A_1$. By using the tool as a lever, it is now possible to easily pull back the locking clip $St_1$, namely upwardly in FIG. 2. The curved parts 31 of the legs 28, 29 slide first on the base 26a of the peripheral groove 26 starting a spreading apart of the legs. After a certain path of movement, the end sections 33 come into contact with the cylindrical surface 4 of the receiving part $A_1$ and slide along the surface, which causes the legs 28, 29 to be spread further apart. Finally, the end sections 33 move into the recesses 16, 17. Once they rest on the stop surfaces 16a, 17a, a further pulling back of the male part is no longer possible. This situation is illustrated in FIG. 3. The legs 28, 29 of the locking clip $St_1$ are completely pulled out of the peripheral groove 26 in the situation according to FIG. 3. The male part $S_1$ can now be pulled out.

The locking clip $St_1$ can be moved back to its locking position prior to a recoupling of the connection. If the male part $S_1$ is now introduced, its conical surface 23 comes first into contact with the legs 28, 29 and spreads these apart. The conical surface 23 continues to act onto the axial spring $F_1$ and changes its form from the original rectangular form to the form illustrated in FIG. 1. The legs 28, 29 finally engage, caused by their elastic forces, the peripheral groove 26 of the male part $S_1$, after which locking occurs.

However, one can also proceed such that the locking clip $St_1$ remains first in the position according to FIG. 3 and that only after completely pressing in the male part $S_1$ into the female part $A_1$, the locking clip $St_1$ is moved into the locking position.

The introduction of the male part $S_1$ is made easier by the front conical surface 21 on the male part $S_1$ and the conical enlargements 12 and 7 on the female part $A_1$.

Figure 5:
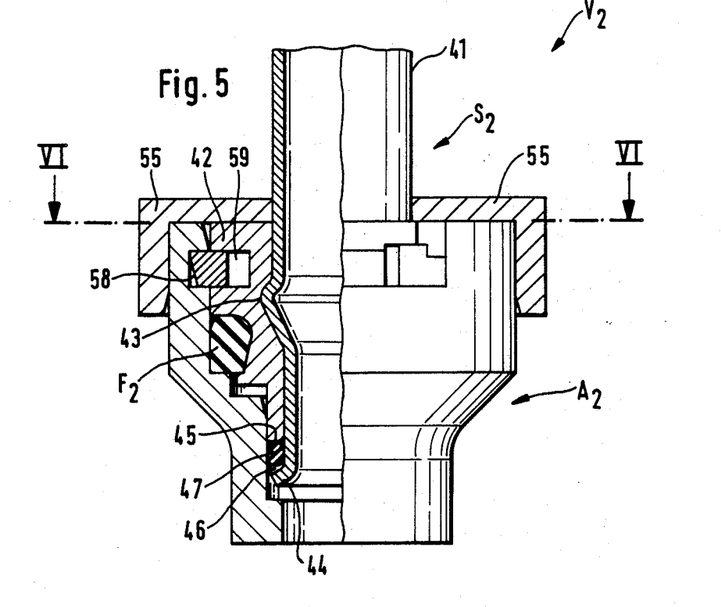
FIG. 5 is an illustration corresponding with FIG. 1 of a plug-in connection according to a second embodiment of the invention.

The plug-in connection $V_2$ according to FIG. 5 has a female part $A_2$, which is constructed similarly to the female part $A_1$, however, it does not have an external thread, but must be welded in.

The male part $S_2$ is provided at the end of a rigid tube 41, which tube 41 is at the same time part of the male part $S_2$. The male part $S_2$ has an annular part 42, into which the tube 41 is fitted, namely into an inner groove 43 of the annular part 42, which causes the tube to be axially secured. The front end of the tube 41 is flanged as at 44 and forms together with the end surface 45 of the annular part 42 an abutment for receiving a seal ring 47, which corresponds with the seal ring $D_1$ according to FIG. 1.

Figure 6:
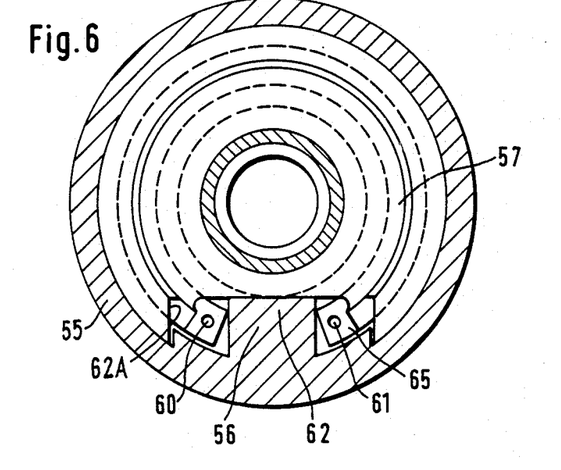
FIG. 6 is a cross-sectional view taken along the line VI—VI of FIG. 5.

To connect the female part $A_2$ with the male part $S_2$, a spring ring 57, which is illustrated in the top view in FIG. 6, is used in this exemplary embodiment. The spring ring is chamfered on the outside, which makes insertion easier, and has noses 65 which center it on the male part $S_2$. The spring ring is received in an inner annular groove 58 of the female part $A_2$ and an outer annular groove 59 of the male part $S_2$, so that in the illustrated locking position, a relative axial movement of the female part $A_2$ and the male part $S_2$ is avoided. To release the plug-in connection, the spring ring is compressed by a tool, which is inserted into the two bores 60 and 61 of the spring ring, so that the spring ring lies now completely in the outer annular groove 59 of the male part $S_2$. The male part $S_2$ can easily be pulled off in this position.

Furthermore, a cap 55 is moved onto the male part $S_2$ and is connected preferably fixed against rotation to the male part $S_2$. The cap 55 has a nose 62 received a corresponding recess 62A in the female part $A_2$ and between the free ends of the spring ring so that the spring ring cannot be inadvertently tensioned and so that in the locked position, the male part $S_2$ and the female part $A_2$ are secured against rotation.

Otherwise, the plug-in connection $V_2$ is constructed with respect to its locking and its axial spring $F_2$ like the described plug-in connections $V_1$, so that further explanations are not needed.

Figure 4:
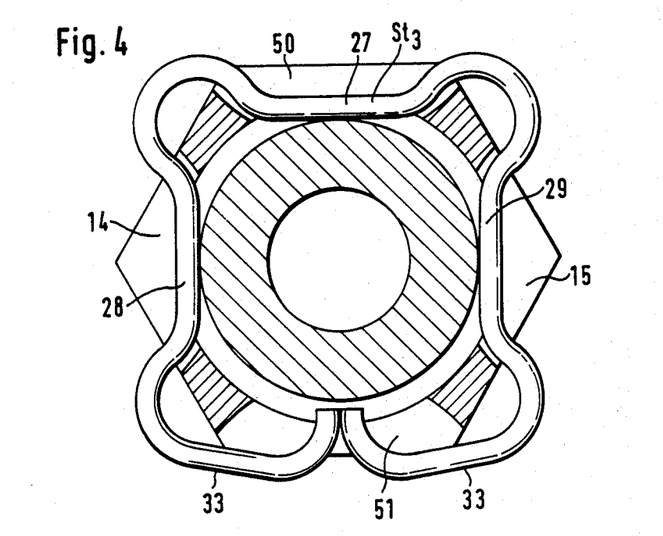
FIG. 4 is a cross-sectional view corresponding with FIG. 2 of a second embodiment.

A further modification of a locking clip $St_3$ is illustrated in the exemplary embodiment according to FIG. 4, which locking clip differs from the locking clip $St_1$ according to FIG. 2, in that the bar 27 and the legs 28, 29 are similarly shaped and are each received in a female-part cavity 14, 15 and 50. Furthermore, the leg extensions 33 are bent further inwardly than this is the case with the locking clip according to FIG. 2, so that the ends engage a further female-part cavity 51. The female-part cavities 14, 15 and 50, 51 are constructed alike, so that the locking clip $St_3$ can be moved as desired onto the plug-in connection. During a pulling out of the locking clip $St_3$, the leg extensions 33 slide on correspondingly constructed surfaces, so that the plug-in connection can be released corresponding with the exemplary embodiment according to FIG. 1.

Figure 7:
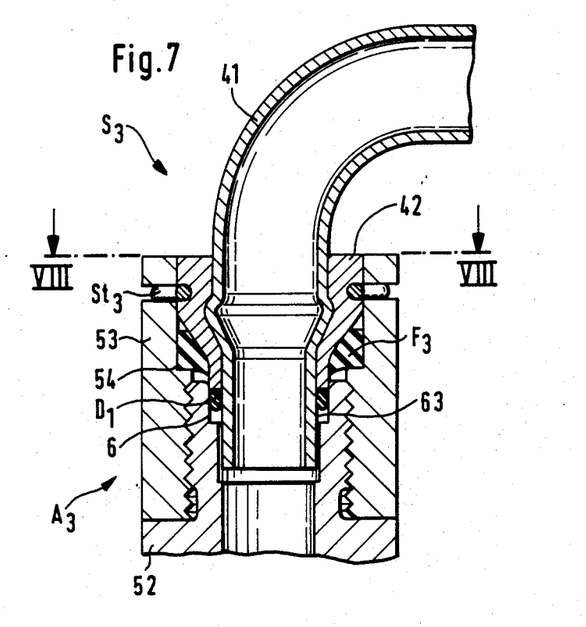
FIG. 7 illustrates a third embodiment of the invention with the possibility to slowly relieve pressure.
Figure 8:
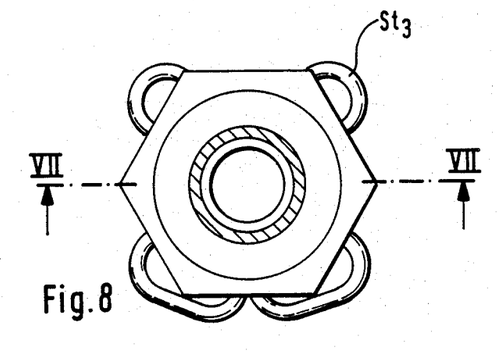
FIG. 8 is a cross-sectional view taken along the line VII—VII.
Figure 9:
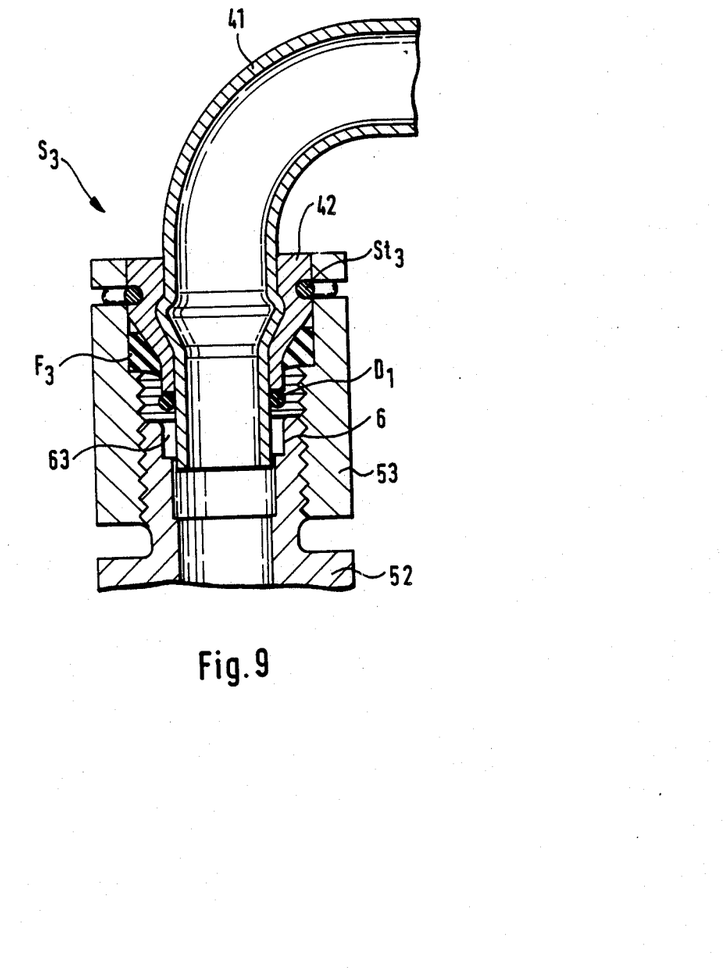
FIG. 9 is a cross-sectional view corresponding with FIG. 7 in the pressure-reduction position.

The exemplary embodiment according to FIGS. 7 to 9 corresponds in its design substantially with the exemplary embodiment according to FIGS. 5 and 6, since here too the tube 41 is fitted into the annular part 42 of the male part $S_3$. The locking clip $St_3$ is constructed corresponding with FIG. 4. The difference with respect to the exemplary embodiment according to FIGS. 5 and 6 consists in the female part $A_3$ being constructed in two parts and consisting of a female piece 52 with an external thread and a sleeve 53 with an internal thread. The female piece has furthermore on its inner surface a cylindrical relief 63, which receives the seal $D_1$, which seals off the female piece 52 with respect to the tube 41. Thus, the seal $D_1$ rests on the one side on the tube 41 and on the other side on the cylindrical surface 6, whereby the seal $D_1$ is secured on the tube 41. The sealing between the annular part 42 of the male part $S_3$ and the sleeve 53 of the female part $A_3$ is taken over by the spring $F_3$, which at the same time, as has been described earlier, takes over the axial guying of the male part and the female part.

With the help of the two-part design of the female part $A_3$, it is possible to carry out a pressure reduction in the tube lines alone with the help of the plug-in connection prior to the release of the plug-in connection. The sleeve is, for this purpose, as is illustrated in FIG. 9, rotated on the female piece 52 until the seal $D_1$ no longer rests on the cylindrical surface 6 of the female piece 52. Pressure medium can in this position reach the threads between the female piece and the sleeve, so that a slow pressure reduction through the threads occurs. An upward exiting of the pressure medium continues to be prevented by the spring $F_3$. The plug-in connection is released, as this has already been described earlier, by moving the locking clip $St_3$.

We claim:

1. In a plug-in connection for connecting tube and hose lines, comprising a male-part having thereon first means defining a clip-receiving, radially outwardly opening, locking groove, a female-part having second means thereon adapted to sealingly receive therein said male-part, said female-part having third means defining a radially inwardly opening cavity means thereon adapted to be radially aligned with said locking groove, a locking clip with legs, said legs of said locking clip being adapted to be received in both said cavity means in said female-part and said locking groove when radially aligned with each other, the improvement comprising each of said legs of said locking clip have fourth means defining an extension extending transversely to the longitudinal length of said leg, wherein said female-part has fifth means defining plural abutments in said cavity means adapted to engage and abut said extensions, said abutments being oriented adjacent the peripheral surface of said female-part, radially outside the region whereat said extensions are located when said locking clip serves to lock said male-part to said female-part, said locking clip being supported on said female-part for radial movement relative to said female-part, said locking clip being made of elastically yieldable material, said extensions being oriented, in a relaxed condition of said locking clip, adjacent one another spaced from said abutments, surface means on said female-part for effecting a spreading apart of said legs on said locking clip in response to said locking clip being moved radially of said female-part whereby a radial movement of said locking clip relative to said female-part will cause said extensions and said legs to spread apart to bring said legs wholly out of said locking groove to thereby release the lock holding said male-part in said female-part and to thereby facilitate a relative axial movement between said male-part and said female-part, said extensions eventually coming into abutting relation with said abutments during a continued radial movement to thereby prevent said locking clip from being removed from its connected relationship with said female-part and said legs thereof from being further spread apart.

2. The plug-in connection according to claim 1, wherein a conical surface cooperating with said legs during an insertion of said male-part into said female-part is provided on said male-part, which conical surface presses said legs apart when said locking clip is in said relaxed condition.

3. The plug-in connection according to claim 1, wherein said radially inwardly opening cavity means on said female-part also includes means defining plural and separate radially outwardly opening slots.

4. The plug-in connection according to claim 3, wherein said means defining plural and separate radially outwardly opening slots on said female-part are provided on opposing 90° spaced apart faces of said female-part, and wherein said locking clip includes a bar part extending beyond a peripheral dimension of said female-part adjacent each of said 90° spaced apart slots to facilitate engagement by a pull-back tool.

5. The plug-in connection according to claim 4, wherein said slots on said female-part are constructed alike.

6. The plug-in connection according to claim 1, wherein said extensions are constructed as integral bent end sections of said legs.

7. The plug-in connection according to claim 1, wherein said locking groove is an annular groove having an inside diameter, wherein said legs of said locking clip have circular sections, the inside diameter of which is conformed to said inside diameter of said annular locking groove.

8. The plug-in connection according to claim 1, including a guiding-in enlargement means on said female-part to make insertion of said male-part into said female-part easier.

9. The plug-in connection according to claim 1, wherein said locking clip has a bar part which projects, in the locking state, beyond an outer extremity of said female-part, so that a free space for engagement by the pull-back tool exits.

10. The plug-in connection according to claim 1, wherein a spring is arranged in said female-part and in engaging relation with and between said female-part and said male-part such that said spring urges said female-part and male-part in axially opposite directions.

11. The plug-in connection according to claim 10, wherein said male-part has a cylindrical part and said female-part has a cylindrical opening conformed in size to said cylindrical part, and wherein a seal ring is provided in an annular groove in said cylindrical opening for sealing said female-part to said male-part.

12. The plug-in connection according to claim 10, wherein said spring is made of an elastic material and defines an annular elastic seal which prevents the penetration of dirt and moisture between said female-part and said male-part.

13. The plug-in connection according to claim 12, wherein said spring has a rectangular cross section in a relaxed state, and, in a coupling state, said spring is deformed into an approximately trapezoidal cross section by a conical surface on said male-part.

14. The plug-in connection according to claim 10, wherein said female-part is constructed in two parts and consists of a female piece with an external thread and a sleeve with an internal thread, wherein said female piece is provided with a cylindrical relief for receiving a seal ring therein, said sleeve having means defining a stop surface for said spring and wherein said locking groove is provided on said sleeve.

15. The plug-in connection according to claim 14, wherein a cap is fixedly mounted on said male-part, which cap includes means for connection to said female-part so as to prevent said female-part and said male-part from rotating with respect to one another.

16. The plug-in connection according to claim 1, wherein said surface means includes at least a portion of said peripheral surface of said female-part, said peripheral surface being cylindrical in cross section, and wherein said extensions engage a portion of said peripheral surface when said locking clip is moved radially of said female-part to effect a spreading apart of said legs.

17. The plug-in connection according to claim 1, wherein said male-part is a tubular member which has a radially outwardly flanged end, said flanged end defining a wall against which a seal member abuts, said tubular member having an annular part in encircling relation therewith, one end of said annular part abutting against said seal member when said tubular member with said annular part thereon are both received in said female-part.

18. In a plug-in connection for connecting tube and hose lines, comprising a male-part having thereon first means defining a clip-receiving locking groove, a female-part having second means thereon adapted to sealingly receive therein said male-part, said female-part having cavity means thereon adapted to be radially aligned with said locking groove and an end face facing toward said male-part, a locking clip with legs, said legs of said locking clip being adapted to be received in both said cavity means in said female-part and said locking groove when radially aligned with each other, the improvement comprising said locking clip being a spring ring having a generally C-shape, said spring ring having, in a relaxed condition thereof, spaced apart free ends and an outer diameter that is greater than an outer diameter of said male-part so that a radially outer segment of said spring ring is received in said cavity means on said female-part, an inner diameter dimension of said spring ring being greater than a diameter of a bottom wall of said locking groove, but less than an outer diameter of said locking groove, said spring ring having a radial thickness dimension such that a tensioning of said spring ring, caused by a reduction in the outer diameter of said spring ring to a size less than an inner diameter dimension of said cavity means on said female-part will cause said spring ring to be removed from said cavity means and become wholly oriented in said locking groove to allow said male-part and said female-part to become separated from one another, at least a portion of said radial thickness dimension of said spring ring being retained in said locking groove of said male-part when said spring ring is in said relaxed condition, said female-part having a recess therein exposing said spaced apart free ends of said spring ring to thereby facilitate access to said free ends of said spring ring to enable a tensioning thereof by the use of a tool, and a cap slidably mounted on said male-part and adapted to be fittingly received over said end face of said female-part adjacent said spring ring, said cap having a nose element received in said recess and snugly between said spaced apart free ends of said spring ring to prevent an inadvertent tensioning of said spring ring.

19. The plug-in connection according to claim 18, wherein said spring ring has noses, which cooperate with correspondingly formed recesses in said male-part.

* * * * *